(12) United States Patent
Gupta

(10) Patent No.: US 10,248,969 B2
(45) Date of Patent: Apr. 2, 2019

(54) SYSTEM AND METHOD FOR SELF-ADAPTING KEYWORD PREDICTION

(71) Applicant: WAL-MART STORES, INC., Bentonville, AR (US)

(72) Inventor: Anand Gupta, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 442 days.

(21) Appl. No.: 14/990,069

(22) Filed: Jan. 7, 2016

(65) Prior Publication Data

US 2017/0200194 A1    Jul. 13, 2017

(51) Int. Cl.
*G06Q 30/00* (2012.01)
*G06Q 30/02* (2012.01)
*G06F 17/30* (2006.01)

(52) U.S. Cl.
CPC ... *G06Q 30/0256* (2013.01); *G06F 17/30867* (2013.01); *G06Q 30/0275* (2013.01)

(58) Field of Classification Search
None
See application file for complete search history.

(56) References Cited

U.S. PATENT DOCUMENTS

| | | | | |
|---|---|---|---|---|
| 2014/0046756 A1* | 2/2014 | Wang | ................ | G06Q 30/0251 705/14.45 |
| 2016/0267535 A1* | 9/2016 | Bhattacharjee | .... | G06Q 30/0256 |

* cited by examiner

*Primary Examiner* — Alvin L Brown
(74) *Attorney, Agent, or Firm* — Bryan Cave Leighton Paisner LLP

(57) ABSTRACT

A system and method for implementing keyword prediction for search engine marketing is presented. Historical search data is analyzed to find top search patterns in the form of n-grams. Keywords from historical search data are analyzed to generate n-grams for various values of n. The n-grams can represent trending search term patterns, as opposed to merely finding trending keywords. Thereafter, each of the n-grams is associated with one or more categories and/or sub-categories. The categories and sub-categories are thus associated with one or more n-grams. When a new product is introduced, the new product can be associated with n-grams based on the categories and sub-categories associated with the new product. Advertisements can be bid upon based on the associations. Other embodiments also are disclosed.

18 Claims, 5 Drawing Sheets

SYSTEM AND METHOD FOR SELF-ADAPTING KEYWORD PREDICTION

TECHNICAL FIELD

This disclosure relates generally to search engines, and relates more particularly to managing keywords in search engine marketing.

BACKGROUND

Search engines such as Google, Bing, and Yahoo are often used to find information on the Internet quickly. As is well known, a user enters a search term into a search engine, and a set of results is presented to the user. Often times, the search results display advertisements to the user. The advertisements might be displayed at the top of the search results. The advertisements displayed to the user might be the result of a marketing campaign in which a person or entity purchases the right to have their link displayed when certain keywords are displayed. It would be desirable to have a method and system of optimizing the selection of keywords for purchase.

BRIEF DESCRIPTION OF THE DRAWINGS

To facilitate further description of the embodiments, the following drawings are provided in which.

Figure 1:
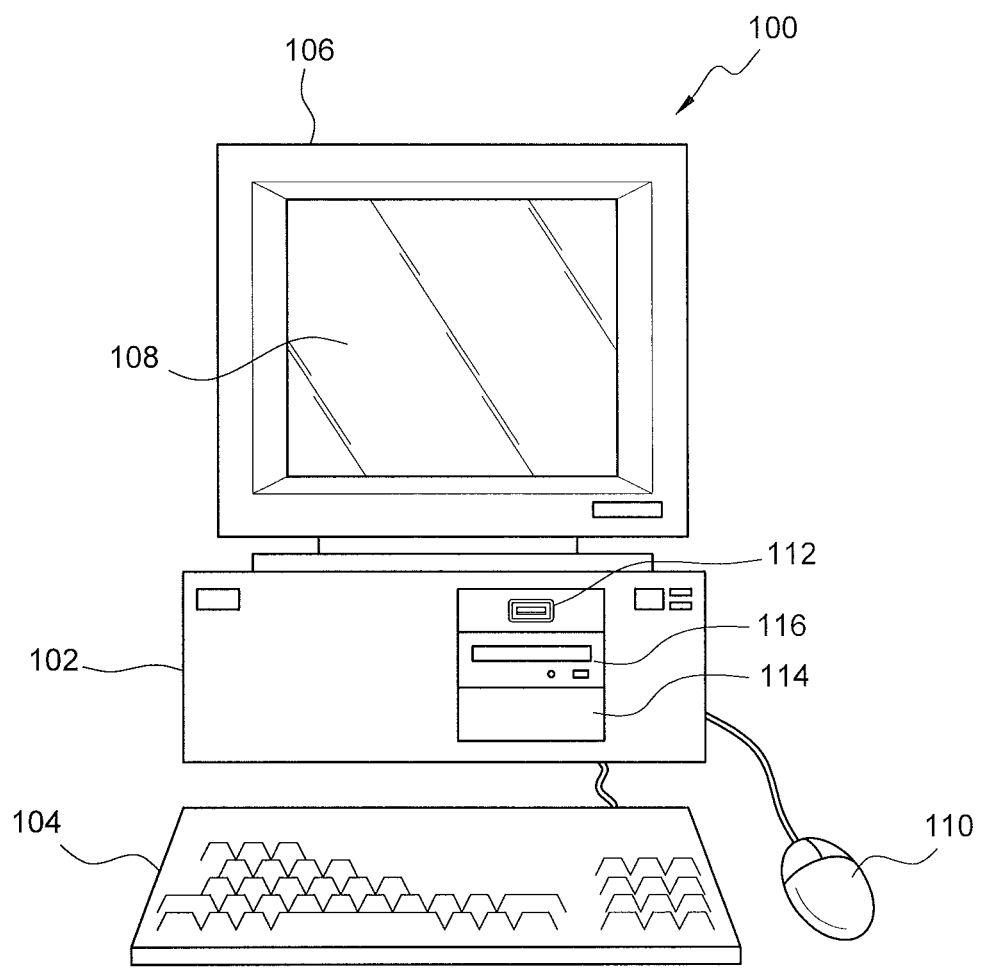
FIG. 1 illustrates a front elevation view of a computer system that is suitable for implementing at least part of a central computer system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system can include: one or more processing modules; and one or more non-transitory memory storage modules storing computing instructions configured to run on the one or more processing modules and perform the acts of: receiving a list of historical search queries; generating one or more n-grams from a subset of each search query in the list of historical search queries; mapping each of the one or more n-grams with one or more terms; determining a category for each term of the one or more terms; associating a new item with one or more patterns of the one or more n-grams based on an associated category for the new item; and placing a bid on a keyword based on the one or more patterns of the one or more n-grams.

Some embodiments include a method. The method can include: receiving a list of historical search queries; generating one or more n-grams from a subset of each search query in the list of historical search queries; mapping each of the one or more n-grams with one or more terms; determining a category for each term of the one or more terms; associating a new item with one or more patterns of the one or more n-grams based on an associated category for the new item; and placing a bid on a keyword based on the one or more patterns of the one or more n-grams.

Figure 2:
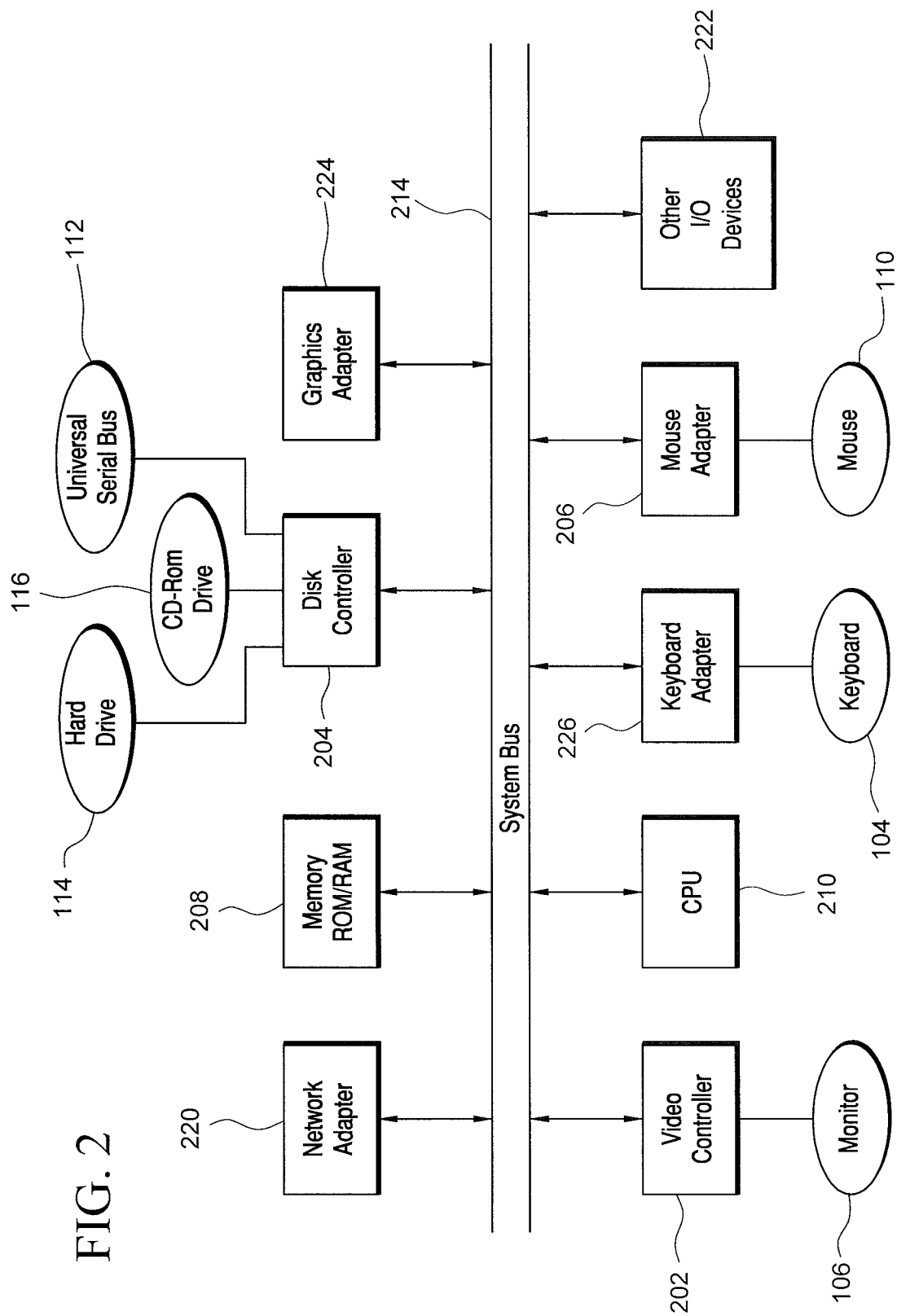
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a drive 114. Drive 114 can be a hard drive that uses spinning magnetic disks to store data or it can be a solid state drive (SSD) that uses a fast, non-volatile memory for storage. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
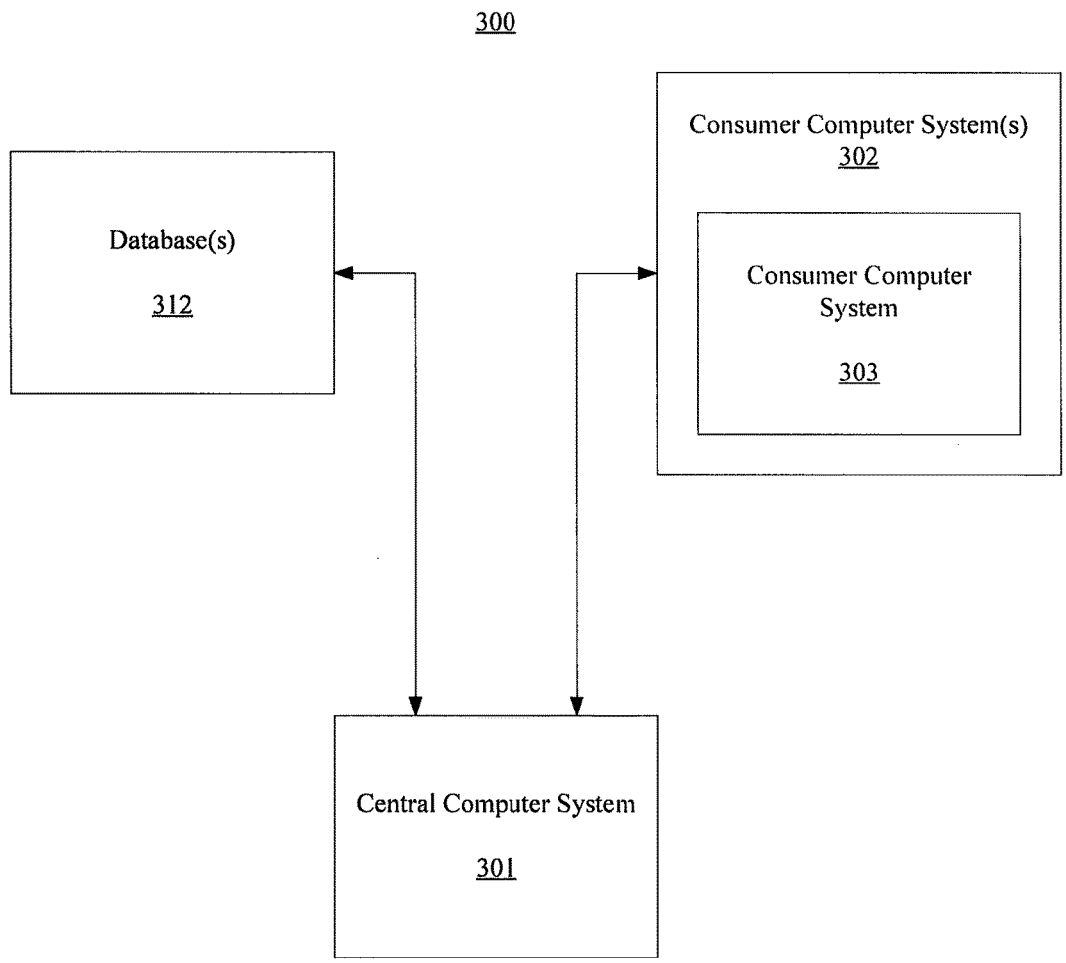
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more predetermined acts performed by the consumer and reactive acts can refer to acts (e.g., identification, determination, communication, etc.) performed with consideration of (i.e., in response to) one or more predetermined acts performed by the consumer. For example, in some embodiments, the predetermined act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touchscreen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™ and Windows 10 (mobile)™ operating systems by Microsoft Corporation of Redmond, Wash., United States of America, or (vi) the Symbian™ operating system by Nokia Corp. of Keilaniemi, Espoo, Finland.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312, or it can be spread across multiple ones of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, and the like. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer. But in many embodiments, the functionality of system 300 can be extended to each of consumer computer system(s) 302 and/or to multiple consumers. In these extended examples, in some embodiments, single consumers can interface (e.g., interact) with central computer system 301 with multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

Search engines are commonly used by a user to find content on the Internet relevant to the user. A user can use a browser operating on a computer system (such as consumer computer system 303) to access the search engine. Exemplary search engines include Google, Bing, and Yahoo. A user also can use an app on a mobile electronic device to access a search engine. A user uses a search engine by entering in a search term (e.g., via a keyboard (either physical or on a display) or via a voice interface). The search engine performs a search and provides the results via the browser.

Often times, the search engine can be configured to display advertisements on the search results web page. For example, Google has a system called Google AdWords. In Google AdWords (and similar advertisement system from other search engines) enable an advertiser to place bids on keywords for advertisement purposes. When those keywords are typed into the search engine, the advertisement is shown to a requesting user at the top and/or side of the search results. Bing has a similar system called Bing Ads.

For an example of how a business might use such a service, consider a retail store located in Phoenix, Ariz. Such a business might place a bid on certain keywords related to the store, such as "sofa," "table," "chair," and the like. Bids also can be placed on related phrases, such as "love seat," "coffee table," and "bedroom set." Bids also can be placed on phrases related to the store itself, such as "furniture store," and "Phoenix furniture." The phrases might have other terms related to the search, such as "best deal sofa" or "where to buy bedroom set in Phoenix."

The bids on keywords typically indicate how much a particular person or entity is willing to pay to be listed as an advertisement for that specific keyword. Often times, the bid is in terms of "cost per click." In other words, the purchaser of an advertising term bids on how much it is willing to pay for each time a user clicks on the advertisement. An advantage to the purchaser is that it only has to make a payment to the search engine provider when an advertisement is clicked.

Which advertisement gets displayed is determined in a variety of different manners. In some search engines, the cost per click bid is combined with a "quality score" to determine an "ad rank" for the particular keyword/bidder combination. A quality score is based on various factors that represent the quality of an ad, such as the relevance and quality of the keyword, the quality of the landing page the ad leads to, the relevance of the ad text, click-through rate, and historical performance of an advertiser's account. A quality score serves to lower the score of advertisers who use "spam" keywords (e.g., bidding on a keyword that has nothing to do with the ad text, being used to present your ads near the top of unrelated keywords). The quality score also can be affected by the length of time a keyword has been bid upon by a certain entity. Thus, this factor presents an additional incentive to be early in bidding on a keyword (also known as "first mover's advantage.")

The cost per click bid is combined with the quality score to determine an "ad rank." The keyword/bidder with the highest ad rank is displayed first when the keyword is entered into the search engine. Thus, an advertiser who is actually bidding less than a competitor can still have a higher ad rank if the advertiser's quality score is higher than the competitor's quality score. Because of the effect of the quality score, an advertiser can lower their cost per click bid for keywords with a high quality score. For example, it has been found that having a quality score of 10 (on a scale of 1 to 10) can save a bidder up to 50% over an average advertiser. Each search engine has a proprietary method of determining quality score and ad rank, but each method can have a similarity to the scheme described above.

Because of the importance of Internet advertising, an advertiser might place bids on many keywords and key phrases (it should be understood that references to "keyword" in this application also can include a multi-word phrase). A typical approach taken by an advertiser to generating keywords for bidding purposes is to collect data, both from general search engines, such as Google and Bing, and from the advertiser's own search data. Thereafter, the data is filtered and cleaned-up. The goal is to find search queries that converted more than a threshold number of times, and then to convert the search queries into keywords that can be bid upon.

A bid on a keyword might also include a match type. A match type signifies how close a keyword must be to be displayed to a user. For example, a bid on a keyword "women's hats" can vary from being an exact match (the ad will be displayed only when a user types in the exact phrase "women's hats" in the search box), to a phrase match (the ad can be displayed for a close variation of the phrase, such as "buy women's hats"), to a broad match modifier (the ad can be displayed on searches that contain the modified term or close variations, such as "hats for women", but not synonyms), to "broad match (the ad can be displayed on searches that contain misspellings, synonyms, related searches, and other variations, such as "buy ladies hats").

One problem with previous methods of generating keywords to bid on is that the typical methods are reactive, only picking keywords to bid on after the keywords have already started trending (becoming popular). For example, a keyword or phrase might start trending only after the product has been released. If a keyword prediction algorithm is executed only once per week (which is typical because of the large number of keyword bids placed by large advertisers), there is a possibility that an entire week's worth of searches were missed. In addition, such a method might not capture different arrangements of keywords. For example, a bid on the keyword "iPhone" might not be displayed for the search phrase "where to buy iPhone." An advertiser, instead of just bidding upon "iPhone," might want to bid upon several different phrases that are actually used by people using search engines.

In addition, the cost of a keyword is related to the popularity of the keyword. Thus, being among the first entities to bid on a new keyword allows an entity to pay less for the keyword than they will in subsequent time periods. This result is because the quality score will be higher based on first mover criteria and also because the click-through rate will be higher for first movers, raising the quality score of the bid.

Figure 4:
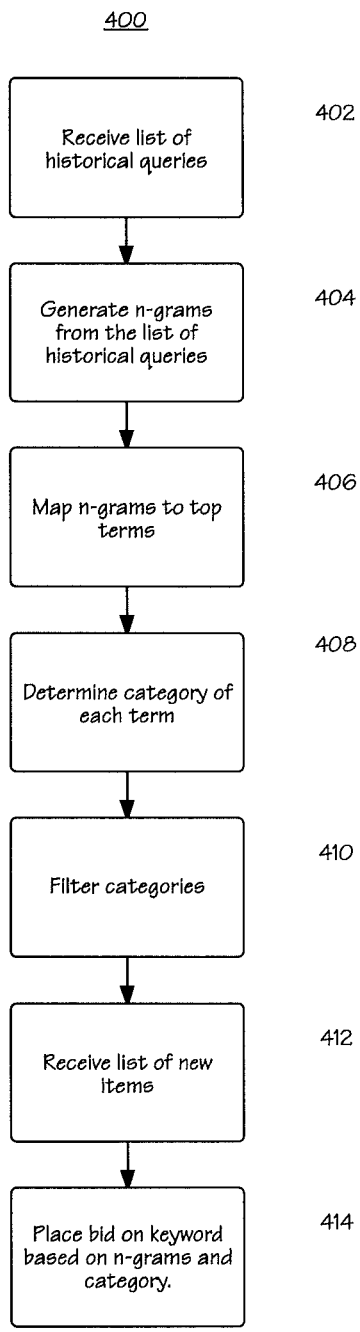
FIG. 4 is a flowchart illustrating the operation of an embodiment.

A flowchart illustrating a method 400 of determining keywords to bid on is presented in FIG. 4. Method 400 is merely exemplary and is not limited to the embodiments presented herein. Method 400 can be employed in many different embodiments or examples not specifically depicted or described herein. In some embodiments, the procedures, the processes and/or the activities of method 400 can be performed in the order presented. In other embodiments, the procedures, the processes, and/or the activities of method 400 can be performed in any other suitable order. In still other embodiments, one or more of the procedures, the processes, and/or the activities of method 400 can be combined or skipped. In some embodiments, portions of method 400 can be implemented by computer system 100 (FIG. 1).

Method 400 might be executed by a retailer selling a variety of different products. Method 400 might also be executed by one interested in selling services or doing promotions for other reasons. A list of historical queries are input into a system operating an embodiment (block 402). The list of historical queries includes a list of keywords and phrases for which a query was run during a specified time period. There also might be a count of how many times each keyword or phrase was used as a search term. These historical keywords can be obtained from a variety of different sources. For example, historical keyword data can be obtained from in-house search engine logs, from search engine providers, such as Bing and Google, and from referrer information from an original search query typed by the user.

Thereafter, n-grams are generated from the list of historical search queries (block 404). In some embodiments, the n-grams can be generated from each search query in the list of historical search queries. In some embodiments, the n-grams can be generated from a subset of the list of historical search queries. An exemplary subset can include queries performed at least a threshold number of times.

An n-gram is a contiguous sequence of n words from a given sequence of text. For example, for a value of n=2, the n-grams for the phrase "to be or not to be" are as follows: "to be," "be or," "or not," "not to," and "to be." The n-grams are then ranked by the number of times each n-gram was searched. In some embodiments, n-grams can be found for values of n=2, n=3, and n=4. In other embodiments, values of up to n=6 can be used. It should be understood that any value of n can be used at this block. Different values of n can be compared and contrasted with each other, such that an n=2 gram such as "to be" can be compared to an n=3 gram such as "to be or." An n-gram can be thought of as a pattern, so the terms might be used interchangeably. One effect of using n-grams is that, instead of finding trending keywords, one is finding trending patterns of search phrases.

The top n-grams are mapped to the top terms (block 406). A term identifies the subject matter of the search. For example, in the search phrase, "where to buy iPhone," an n-gram for n=3 is "where to buy," while the term is "iPhone."

In some embodiments, each of the top 250 search phrases are mapped such that each n-gram are mapped to an associated term. Other numbers of n-grams can be found. As discussed above, this list of the top 250 n-grams can contain n-grams for different values of n. The n-grams can be common search patterns. In an eCommerce embodiment, exemplary n-grams can include n-grams derived from patterns such as, "where can I buy _____," "best deals on _____," and "phone cases _____." The blanks in the pattern indicate where a user would enter a target search phrase.

For each of the top n-grams, the top 20 terms that appear with each gram can be determined. Terms are the blanks in the above examples. For instance, the pattern "where can I buy" can be associated with multiple different terms, such as iPhone, Galaxy, Macbook, Dell, etc. In some embodiments, a number of terms other than 20 can be associated with each n-gram.

For each term, the category of each term found in block 406 is determined (block 408). The category is how the retailer executing method 400 categorizes the items that it sells. In some embodiments, there can be various levels of categories. For example, there can be a category called "electronics" with a sub-category of "mobile phone." The sub-category "mobile phone" can have a number of sub-categories also, such as "Apple," "Android," and "Windows Phone."

Once the category and sub-category for each term is determined, the categories are filtered (block 410). The filtering process can encompass a variety of different techniques. For example, duplicates can be removed from the list of n-grams. There can be a validation such that various terms (such as competitor's names) are not included (past data might show that a certain n-gram is not effective or not allowed by the search engine provider).

The result of this processing is that the top n-grams are now associated with one or more categories and subcategories. In other words, it is known which n-grams work best with a variety of categories and subcategories.

Thereafter, the retailer might receive a list of new items that will be stocked by the retailer (block 412). The list includes information about the item and the categories to which the item belongs. For each item, it can be determined if the same category is present in the table containing keywords and categories. If a keyword/category match is found, then a pattern of n-grams is created from the associated n-grams to create a keyword phrase that can be submitted to search engines as a keyword to be bid upon (block 414).

For example, when a new product is released, an advertiser knows which of its own internal categories and sub-categories to which the item will belong. A new smart phone from Samsung might be in electronics/mobile phones/Android while a new laptop from Apple might be in electronic/computers/Apple. The advertiser will determine which patterns or n-grams perform the best for electronics/mobile phones/Android and which patterns or n-grams perform the best for electronic/computers/Apple. Then, the advertiser is able to place bids on patterns of n-grams with terms relevant to the new item (such as the item name and other characteristics, such as screen size, color, etc.) In such a manner, the advertiser has a more robust set of bids that should have a higher quality score, leading to a lower cost per click bid that will still result in a high placement, in search results.

The above-described embodiment is more adaptable to user search behavior because it is based upon actual user behavior. Furthermore, it can be executed on a regular schedule such as weekly. In such a manner, changes to search patterns can be found relatively quickly. For example, it has been found that user search terms have become longer over recent time periods because the use of natural language user interfaces, such as Siri, Google Now, and Cortana.

Figure 5:
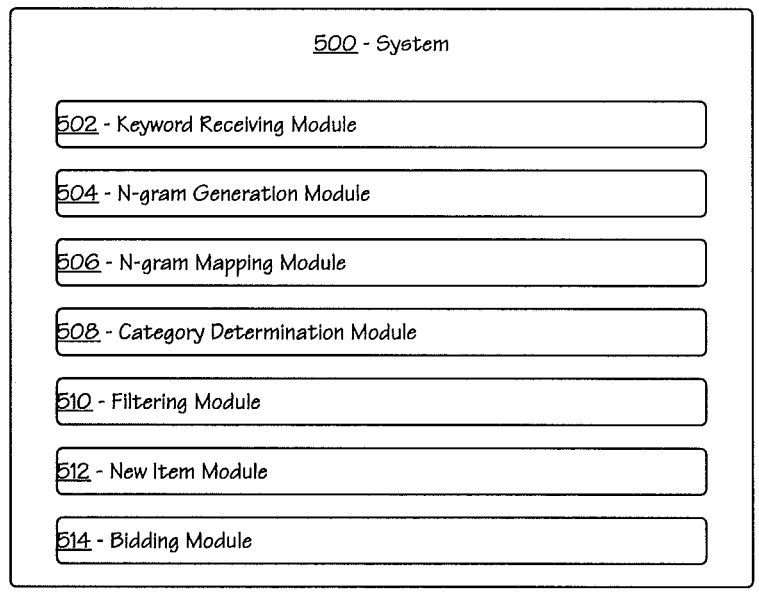
FIG. 5 is a block diagram illustrating a system capable of performing an embodiment.

Turning ahead in the figures, FIG. 5 illustrates a block diagram of a system 500 that is capable of performing disclosed embodiments. System 500 is merely exemplary and is not limited to the embodiments presented herein. System 500 can be employed in many different embodiments or examples not specifically depicted or described herein. In some embodiments, certain elements or modules of system 500 can perform various procedures, processes, and/or acts. In other embodiments, the procedures, processes, and/or acts can be performed by other suitable elements or modules.

In a number of embodiments, system 500 can include keyword receiving module 502. In certain embodiments, instruction receiving module 502 can perform block 402 (FIG. 4) of receiving historical keywords.

In a number of embodiments, system 500 can include n-gram generation module 504. In certain embodiments, n-gram generation module 504 can perform block 404 (FIG. 4) of generating n-grams from keywords.

In a number of embodiments, system 500 can include n-gram mapping module 506. In certain embodiments, n-gram generation module 506 can perform block 406 (FIG. 4) of mapping n-grams with top terms.

In a number of embodiments, system 500 can include category determination module 508. In certain embodiments, category determination module 508 can perform block 408 (FIG. 4) of determining categories and sub-categories for each of the top terms.

In a number of embodiments, system 500 can include filtering module 510. In certain embodiments, filtering module 510 can perform block 410 (FIG. 4) of filtering categories.

In a number of embodiments, system 500 can include new item module 512. In certain embodiments, new item module 512 can perform block 412 (FIG. 4) of receiving a list of new items.

In a number of embodiments, system 500 can include bidding module 514. In certain embodiments, bidding module 514 can perform block 414 (FIG. 4) of placing bids on search terms.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 can be modified, and that the foregoing discussion of certain of these embodiments does not necessarily represent a complete description of all possible embodiments. For example, one or more of the procedures, processes, or activities of FIGS. 1-5 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processing modules; and
   one or more non-transitory memory storage modules storing computing instructions configured to run on the one or more processing modules and perform acts of:
   receiving, at a computer processor, a list of historical internet-based product search queries for internet-based products, the list of historical internet-based product search queries having been placed on an e-commerce website of an e-commerce retailer;

generating, using the computer processor, one or more n-grams from a subset of each internet-based product search query in the list of historical internet-based product search queries;

mapping, using the computer processor, each of the one or more n-grams with one or more online terms;

determining, using the computer processor, a category for each term of the one or more online terms;

associating, using the computer processor, a new item with one or more patterns of the one or more n-grams based on an associated category for the new item, the associated category based at least in part on third-party search engine categories of a third-party that is different from the e-commerce retailer;

forming, using the computer processor, a keyword based on a combination of:
(1) one n-gram of the one or more n-grams; and
(2) a common phrase entered into a search engine for each of the internet-based products, the common phrase not comprising the one n-gram;

placing, using the computer processor, a bid on a keyword on a third-party search engine based on the one or more patterns of the one or more n-grams, wherein the third-party search engine is provided by the third-party that is different from the e-commerce retailer; and facilitating a display of an advertisement for the keyword on the third-party search engine.

2. The system of claim 1, wherein the computing instructions are further configured to perform an act of:
filtering a determination of the category for each term of the one or more online terms.

3. The system of claim 2, wherein filtering the determination comprises:
removing duplicates; and
validating the determination to remove a name of a competitor.

4. The system of claim 1, wherein:
the list of historical internet-based product search queries comprises an indication of a popularity of each internet-based product search query in the list of historical internet-based product search queries, the indication of the popularity comprising a number of times each internet-based product search query in the list of historical internet-based product search queries was searched by a requestor on the e-commerce web site of the e-commerce retailer.

5. The system of claim 4, wherein:
the subset of each internet-based product search query in the list of historical internet-based product search queries is selected based on the popularity of each internet-based product search query in the list of historical internet-based product search queries.

6. The system of claim 1 wherein:
mapping, using the computer processor, each of the one or more n-grams with the one or more online terms comprises mapping each of the one or more n-grams with 20 online terms, wherein each online term of the 20 online terms is based upon third-party search engine data or a product sold by the e-commerce retailer.

7. The system of claim 1, wherein:
the category comprises a type of a product sold by the e-commerce retailer; and
the category is divided into one or more sub-categories, the one or more sub-categories comprising a make or model of the product sold by the e-commerce retailer.

8. The system of claim 1, wherein:
each of the one or more n-grams comprise a series of n consecutive words in an internet-based product query from the list of historical internet-based product search queries; and
n is selected from 1, 2, 3, or 4.

9. The system of claim 1, wherein:
the computing instructions are further configured to perform an act of:
filtering a determination of the category for each term of the one or more online terms;
filtering the determination comprises:
removing duplicates; and
validating the determination to remove a name of a competitor;
the list of historical internet-based product search queries comprises an indication of a popularity of each internet-based product search query in the list of historical internet-based product search queries, the indication of popularity comprising a number of times each internet-based product search query in the list of historical internet-based product search queries was searched by a requestor on the e-commerce web site of the e-commerce retailer;
the subset of each internet-based product search query in the list of historical internet-based product search queries is selected based on the popularity of each internet-based product search query in the list of historical internet-based product search queries;
mapping, using the computer processor, each of the one or more n-grams with the one or more online terms comprises mapping each of the one or more n-grams with 20 online terms, wherein each online term of the 20 online terms is based upon third-party search engine data or a product sold by the e-commerce retailer;
the category comprises a type of the product sold by the e-commerce retailer;
the category is divided into one or more sub-categories, the one or more sub-categories comprising a make or model of the product sold by the e-commerce retailer;
each of the one or more n-grams comprise a series of n consecutive words in an internet-based product query from the list of historical internet-based product search queries; and
n is selected from 1, 2, 3, or 4.

10. A method comprising:
receiving, at a computer processor, a list of historical internet-based product search queries for internet based products, the list of historical internet-based product search queries having been placed on an e-commerce website of an e-commerce retailer;
generating, using the computer processor, one or more n-grams from a subset of each internet-based product search query in the list of historical internet-based product search queries;
mapping, using the computer processor, each of the one or more n-grams with one or more online terms;
determining, using the computer processor, a category for each term of the one or more online terms;
associating, using the computer processor, a new item with one or more patterns of the one or more n-grams based on an associated category for the new item, the associated category based at least in part on third-party search engine categories of a third-party that is different from the e-commerce retailer;

forming, using the computer processor, a keyword based on a combination of:
(1) one n-gram of the one or more n-grams; and
(2) a common phrase entered into a search engine for each of the internet-based products, the common phrase not comprising the one n-gram; and placing, using the computer processor, a bid on a keyword on a third-party search engine based on the one or more patterns of the one or more n-grams, wherein the third-party search engine is provided by the third-party that is different from the e-commerce retailer; and facilitating a display of an advertisement for the keyword on the third-party search engine.

11. The method of claim 10 further comprising:
filtering a determination of the category for each term of the one or more online terms.

12. The method of claim 11, wherein filtering the determination comprises:
removing duplicates; and
validating the determination to remove a name of a competitor.

13. The method of claim 10, wherein:
the list of historical internet-based product search queries comprises an indication of a popularity of each internet-based product search query in the list of historical internet-based product search queries, the indication of the popularity comprising a number of times each internet-based product search query in the list of historical internet-based product search queries was searched by a requestor on the e-commerce web site of the e-commerce retailer.

14. The method of claim 13, wherein:
the subset of each internet-based product search query in the list of historical internet-based product search queries is selected based on the popularity of each internet-based product search query in the list of historical internet-based product search queries.

15. The method of claim 10, wherein:
mapping, using the computer processor, each of the one or more n-grams with the one or more online terms comprises mapping each of the one or more n-grams with 20 online terms, wherein each online term of the 20 online terms is based upon third-party search engine data or a product sold by the e-commerce retailer.

16. The method of claim 10, wherein:
the category comprises a type of a product sold by the e-commerce retailer; and the category is divided into one or more sub-categories, the one or more sub-categories comprising a make or model of the product sold by the e-commerce retailer.

17. The method of claim 10, wherein:
each of the one or more n-grams comprise a series of n consecutive words in an internet-based product query from the list of historical internet-based product search queries; and
n is selected from 1, 2, 3, or 4.

18. The method of claim 10, wherein:
the method further comprises:
filtering a determination of the category for each term of the one or more online terms;
filtering the determination comprises:
removing duplicates; and
validating the determination to remove a name of a competitor;
the list of historical internet-based product search queries comprises an indication of a popularity of each internet-based product search query in the list of historical internet-based product search queries, the indication of the popularity comprising a number of times each internet-based product search query in the list of historical internet-based product search queries was searched by a requestor on the e-commerce web site of the e-commerce retailer;
the subset of each internet-based product search query in the list of historical internet-based product search queries is selected based on the popularity of each internet-based product search query in the list of historical internet-based product search queries;
mapping, using the computer processor, each of the one or more n-grams with the one or more online terms comprises mapping each of the one or more n-grams with 20 online terms, wherein each online term of the 20 online terms is based upon third-party search engine data or a product sold by the e-commerce retailer;
the category comprises a type of the product sold by the e-commerce retailer;
the category is divided into one or more sub-categories, the one or more sub-categories comprising a make or model of the product sold by the e-commerce retailer;
each of the one or more n-grams comprise a series of n consecutive words in an internet-based product query from the list of historical internet-based product search queries; and
n is selected from 1, 2, 3, or 4.

\* \* \* \* \*